United States Patent [19]
Waeschle et al.

[11] Patent Number: 5,775,851
[45] Date of Patent: Jul. 7, 1998

[54] METHOD FOR OPERATING A CONVEYOR PIPELINE WITH DENSE PHASE CONVEYING, AND APPARATUS FOR PERFORMING THE METHOD

[75] Inventors: Franz Waeschle, Weingarted; Dieter Heep, Bergatreute; Guido Winkhardt, Friedrichshafen; Gottfried Isopp, Langenargen, all of Germany

[73] Assignee: Motan Fuller VerFahrenstechnik GmbH, Weingarten, Germany

[21] Appl. No.: 609,820

[22] Filed: Mar. 1, 1996

[51] Int. Cl.⁶ ............................................. B65G 53/06
[52] U.S. Cl. .................................... 406/14; 406/95
[58] Field of Search ........................ 406/11, 14, 94, 406/95

[56] References Cited

FOREIGN PATENT DOCUMENTS

| | | | |
|---|---|---|---|
| 603601 A2 | 6/1994 | European Pat. Off. | 406/95 |
| 1953538 | 5/1971 | Germany | 406/95 |
| 255929 | 4/1988 | Germany | 406/95 |
| 406191640 A | 7/1994 | Japan | 406/14 |

*Primary Examiner*—Gary C. Hoge
*Attorney, Agent, or Firm*—Daniel DeJoseph

[57] ABSTRACT

The present invention relates to a method for operating a conveyor pipeline with pneumatic compact-flow conveying, and to an apparatus for performing the method. In this compact-flow conveying, a shunt line is disposed in a bypass around a conveyor pipeline; feed lines branch off from the shunt line and discharge into the conveyor pipeline at regular intervals via associated spill valves. With the aid of Laval ball valves, the apparatus makes a method possible in which by preventive, temporary increasing of pressure by associating and varying certain bypass air quantities at predetermined time intervals, air is additionally blown out into the conveyor pipeline via a determinable number of overpressure valves, so that even during bulk material conveying, the development of plugs can be avoided.

9 Claims, 4 Drawing Sheets

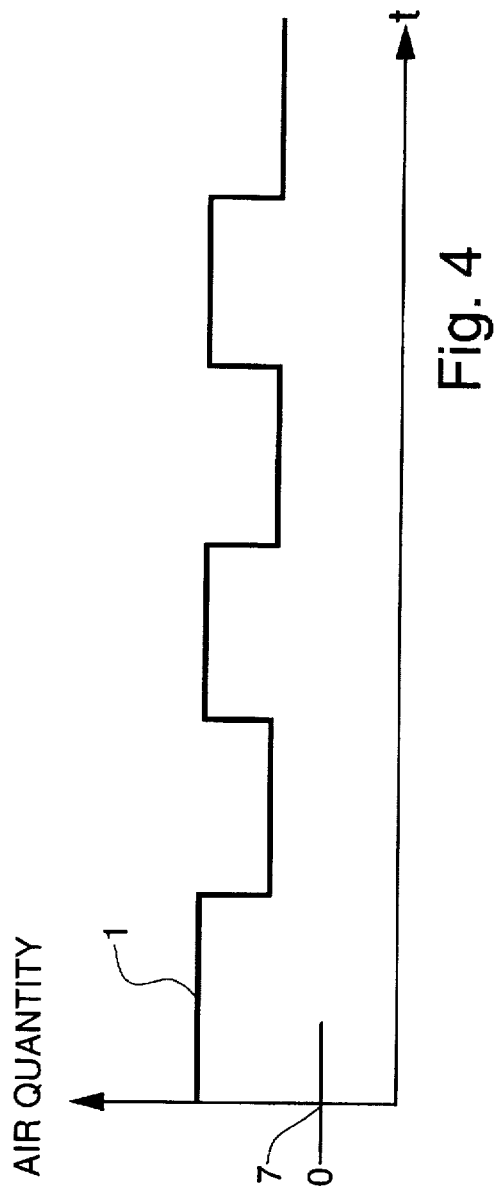
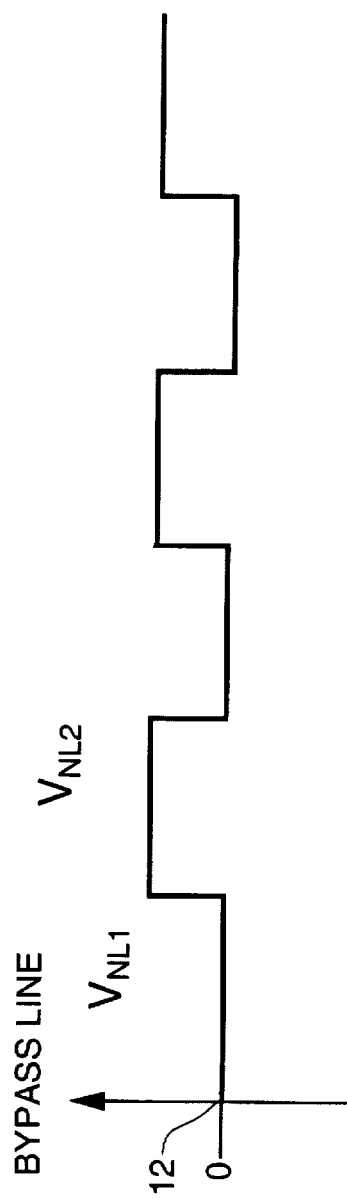

METHOD FOR OPERATING A CONVEYOR PIPELINE WITH DENSE PHASE CONVEYING, AND APPARATUS FOR PERFORMING THE METHOD

The subject of the present invention is a method and an apparatus for operating a conveyor pipeline with bulk material.

BACKGROUND OF THE INVENTION

German Patent 37 14 923 proposes that two shunt lines, the pure gas line and a separate continuous command pressure line, can be utilized to measure a difference from pressure differentials if bulk material transport is impeded.

Using such command pressure shunt lines, however, requires an ideal pressure drop proportionally over the length of the bulk material line, which is not available in practice. In actuality, the course is actually hyperbolalike and is additionally further affected by the disposition of baffles and pipe bends.

The attempt has therefore been made to achieve an approximate, favorable adaptation of the mutual pressure drop by raising the pressure at the beginning of the command pressure shunt line, or by throttling at the end of the shunt line.

Nevertheless, at critical points upstream of pipe bends, plugs form which are not broken up again until after the system has been running a relatively long time.

The principle of dense phase conveying accordingly resides in the provision, in the bypass around a conveyor pipeline, of a shunt line from which feed lines branch off that discharge into the conveyor pipeline at regular intervals via associated spill valves.

This assures that if a plug forms, the spill valves located in the region of the plug and the spill valves downstream of the plug are supplied with an overpressure that causes them to open and pumps the air out of the bypass line additionally into the conveyor pipeline via the feed lines. This loosens up the plug, and makes for better flowability of the plug.

German Patent Application P 42 32 327.4 of the present Applicant describes a system |to| which |reference is made in the present invention. The disclosure thereof is therefore incorporated by reference herein.

This system is distinguished in that it| assures the simplest possible regulation, by means of pressure ramps defined by valve springs.

The efficiency of such a system is substantially dependent on the properties of the bulk material, and it can be observed that in adhesive bulk materials that tend to stick on the walls, eliminating plugs takes much longer than in bulk materials with good air-holding capability, where the automatic valves already hinder the onset of a plug.

The length of time required for automatic plug breakup determines the mean product throughput of a system, and in the least favorable case a capacity of up to 50% less must be expected.

SUMMARY OF THE INVENTION

The object of the present invention is therefore to improve a system of the generic type defined at the outset such that with difficult bulk materials, by preventive precautions, the cause of a later necessary breakup of a plug is eliminated, and the conveying performance with hard-to- handle bulk materials strongly conforms to the typical pattern of conveying easy-to-handle bulk materials.

According to the invention, this object is attained by the characteristics recited in the body of claim 1.

The invention is defined by the technical teaching of claim 1 and the associated apparatus claim.

It has in fact been found that a poor conveying output occurs if one waits for the plug to form before taking steps to eliminate the plug. According to the invention, preventive steps, that is, preventive measures, are taken that already prevent the formation of a plug or stoppage as it starts. To this end, the invention provides that the air in the bypass line is varied at predetermined time intervals, with an intermittent variation being preferred.

This kind of intermittent increasing of the air quantity in the bypass line now means that the spill valves, which are disposed in the connecting path between the bypass line and the conveyor pipeline, open one after the other. Depending on the quantity of air introduced into the bypass line, the pressure in the bypass line rises from the pressure loss of the valves, and by correspondingly raising the pressure in the bypass line one can determine in advance the number of valves that are to open.

The earlier patent application P 42 43 327.4 provides that each spill valve is assigned a certain "pressure ramp". This term means the type of rise in a spring characteristic, which after the spring pressure on an associated spring-loaded valve plate is exceeded causes the spill valve to open.

It has now been found that if a preventive temporary raising of the pressure ramp is done by assigning and varying a bypass air quantity with the aid of reversible Laval ball valves, plug avoidance occurs, instead of plug breakup.

The use of Laval ball valves is preferred, although they are not absolutely necessary to achieve the stated object. Any air quantity regulating valves can be used; it is merely essential that a plurality of calibrated bores be present, so that a large-quantity flow of air can be passed at least through the one bore and upon reversal of the valve a smallquantity air flow can be passed through the other bore.

However, the use of Laval ball valves is preferred, because they are inexpensive and function reliably. A subsonic diffusor, which improves the efficiency, is disposed on a ball valve that is adjustable mechanically or by an electric motor.

This preventive, temporary raising of the pressure ramp is tripped by the exceeding of a limit value at a contact manometer, which is provided on the pure-air-side end of the conveyor pipeline, or is carried out with the aid of variable control times, that is, "intermittent operation" with an optimal adjustment for the bulk material.

The raising or lowering of the pressure ramp takes place with a varied air quantity by means of the resistance of the spill valve, which is expressed as a pressure rise or pressure drop, respectively, in the bypass line and thus defines the number of valves in operation at the same time.

Another advantage is that cleaning of all the valves thus becomes possible, along with plug-free evacuation of the pipeline after conveying has ended.

It is preferred that the ball valve be equipped with at least two calibrated bores. However, it is also possible to provide a ball valve that has more than two such calibrated bores.

Conversely, if a ball valve with two calibrated bores is used, then a further variation in the air quantity introduced through the ball valve can be achieved by connecting a further ball valve in the bypass with a plurality of calibrated bores, so that selectively one or two ball valves is switched in order to obtain many options for varying the conveying air.

Accordingly, the invention contemplates two different operating modes for such a conveyor pipeline.

In a first method, it is provided that regardless of plug development in the conveyor pipeline, the air quantity in the bypass line is increased at precisely predetermined times, so that the spill valves in the connection between the bypass line and the conveyor pipeline can be forced, controlled in succession, to blow out into the conveyor pipeline.

In a second mode of operation of the conveyor pipeline in accordance with the present invention, it is provided that if a limit value is exceeded, a controlled raising of the air quantity in the bypass line is generated from the contact manometer, which is disposed at the entrance to the conveyor pipe line, so that in turn—controlled by the contact manometer—the air quantity in the bypass line can be raised so that once again the individual spill lines in the conveyor pipeline can be forced to blow out into it.

For both modes of operation of the present conveying system, separate, independent patent protection is claimed:

The subject of the present invention is defined not merely by the subject of the individual claims but also by the combination of the claims with one another.

All the indications and characteristics disclosed herein —including the abstract—and in particular the three-dimensional embodiment shown in the drawings are claimed as essential to the invention, to the extent that they are novel either individually or in combination over the prior art.

DESCRIPTION OF THE DRAWINGS

The invention will be described in further detail below in conjunction with drawings, which show merely one possible embodiment. Further characteristics essential to the invention and advantages of the invention will become apparent from the drawings and the description thereof.

Shown are:

FIG. 4, the air quantity and time diagram for the air quantity in the conveyor pipeline:

FIG. 5, the air quantity and time diagram for the air quantity in the bypass line;

DETAILED DESCRIPTION OF THE INVENTION

Figure 1:
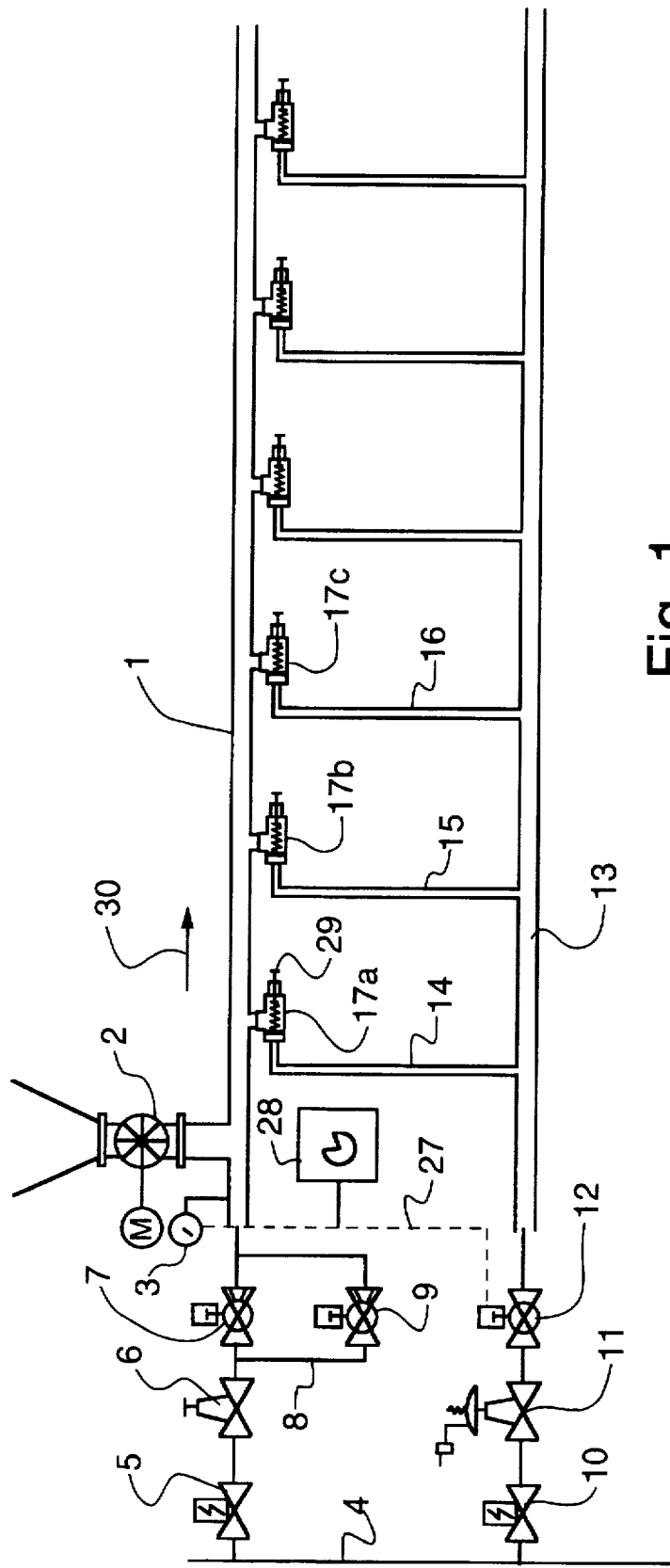
FIG. 1, schematically, a circuit diagram of a conveyor pipeline according to the invention.

Connected to a conveyor pipeline 1 in FIG. 1 is a rotary feeder 2, which conveys bulk material of an arbitrary kind in the conveyor pipeline 1. Upstream of the rotary feeder 2, the air supply of the conveyor pipeline 1 takes place via a supply line 4, beginning at which an electromagnetically actuatable shutoff valve 5 is connected. Connected downstream of the shutoff valve 5 is a pressure reducer 6, and downstream of it an arrangement of two parallel-connected ball valves 7, 9.

The ball valve 9 is connected parallel to the ball valve 7, in the region of a detour line 8. A contact manometer 3 is connected to the entrance to the conveyor pipeline 1 and measures the pressure loss of the conveyor pipeline in operation.

Parallel to the conveyor pipeline 1 is a shunt line 13 (also called a bypass line), which is supplied in turn by the air supply line 4 via an electromagnetically actuatable shutoff valve 10. Downstream of the shutoff valve 10 is a remote-actuated pressure reducer 11, downstream of which in turn is a ball valve 12 that can be actuated by motor or manually or pneumatically.

Branching off from the shunt line 13 are feed lines 14, 15, 16, distributed over the length of the conveyor pipeline 1; one spill valve 17a, 17b, 17c is disposed on each conveyor pipeline and is supplied with air from the shunt line 13 via the feed lines 14–16.

A spring-loaded valve plate is disposed in each spill valve 17, and the spring characteristic can be adjusted via an adjusting wheel 29. The adjustment is done in such a way that downstream of the conveyor pipeline 1 (direction of the arrow 30), an ever-higher spring pressure is established with the adjusting wheel 29).

As a result, for a certain air quantity in the shunt line 13, the first, upstream spill valve 17a opens first, and after that the further spill valves 17b, 17c, etc., in succession, in accordance with the pressure in the shunt line 13.

Figure 2:
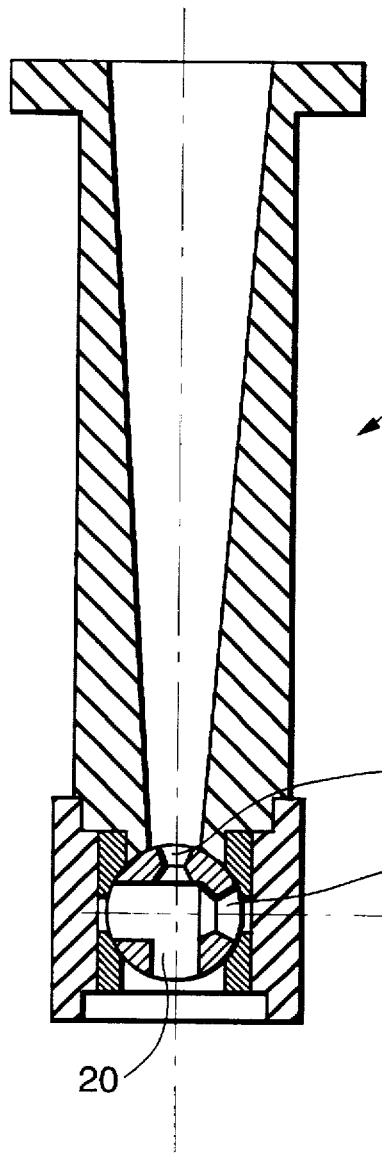
FIG. 2, a section through a ball valve according to the invention in a first operating position.
Figure 3:
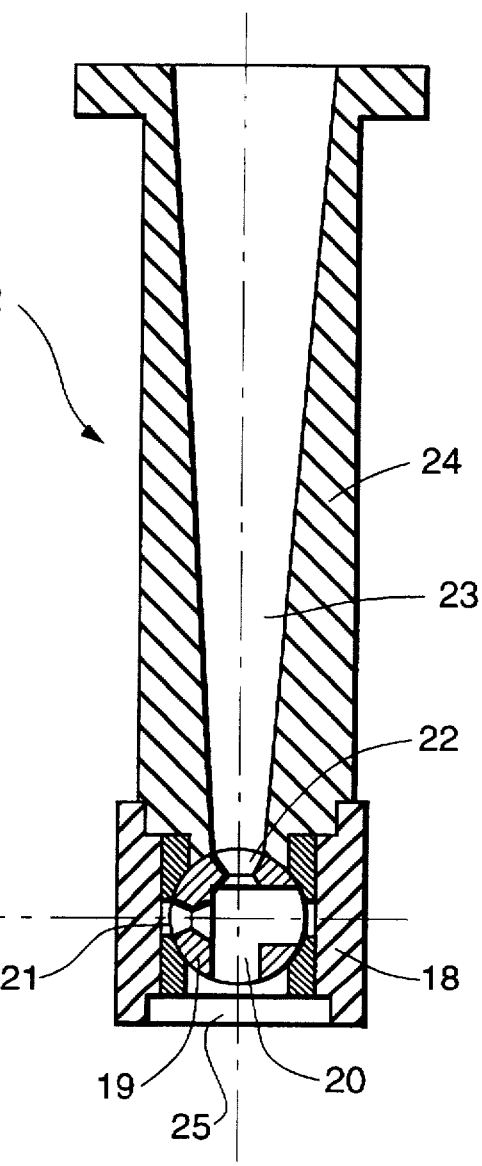
FIG. 3, a section through the ball valve in a second operating position.

As described at the outset, ball valves 7, 9, 12 are present, which are preferably embodied as Laval ball valves. As shown in FIGS. 2 and 3, each ball valve 7, 9, 12 comprises a housing 18 in which a ball 19 is rotatably supported. A pipe elbow 20 is disposed in the ball 19 and is embodied as an angular passage. Two Laval bores 21, 22 are also present, disposed at an angle of 90° to one another in the ball 19 and communicating in airlock fashion with the pipe elbow 20.

Figure 6:
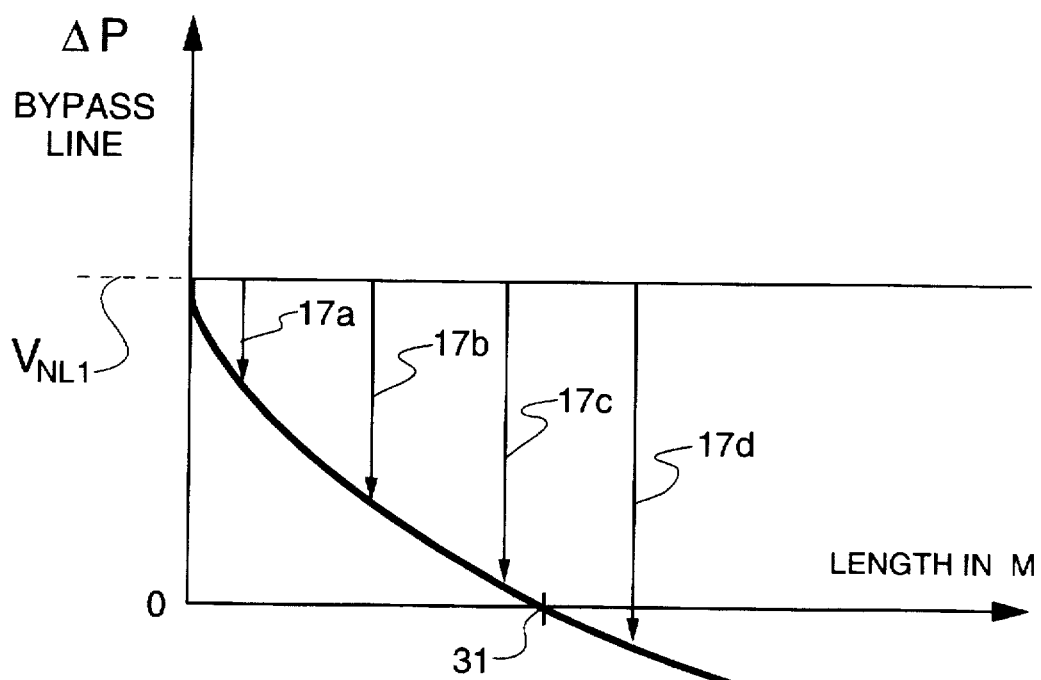
FIG. 6, the differential pressure and length diagram in the bypass line, with a first air quantity in the bypass line.

In the position of FIG. 2, of the ball 19, the smaller-caliber bore 21 blows into the conical bore 23 of the subsonic diffusor 24, and as a result a relatively small air quantity is introduced, which for the ball valve 12 in the shunt line 13 corresponds to the air quantity $V_{NL1}$ (FIG. 6).

Figure 7:
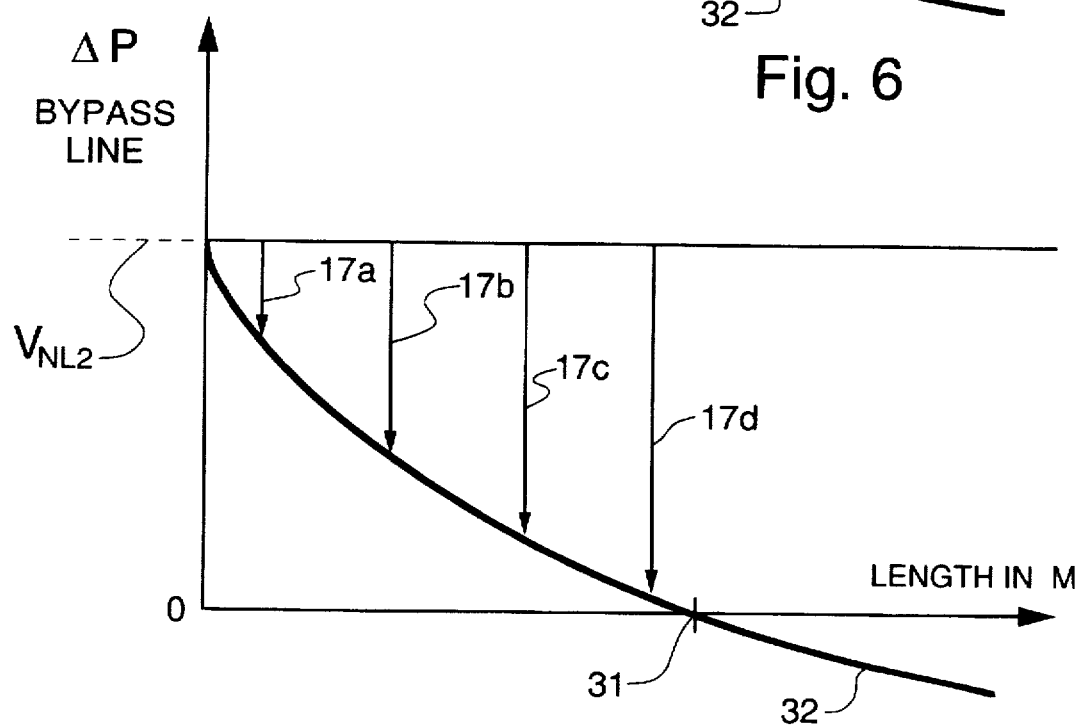
FIG. 7, the same diagram as FIG. 6, but with a second, increased air quantity in the bypass line.

In the position of the ball 19 of FIG. 3, the pipe elbow 20 is rotated 90°, so that the entrance 25 communicates in airlock fashion via the pipe elbow 20 with the larger-caliber bore 22, resulting in an increased air quantity VNL2 (see FIG. 7).

In order to maintain an always identical air quantity from the supply line 4, it is preferred that the air quantity in the conveyor pipeline—defined by the position of the ball valves 7, 9—be approximately equal to the air quantity in the shunt line 13, which is defined by the corresponding position of the ball valve 12. This is the normal conveying situation; that is, in the normal conveying situation the ball valves 7, 9 and 12 are rotated with their corresponding bores 21, 22 in such a way that an approximately 50:50 split in the air quantity in the conveyor pipeline and the shunt line 13 takes place.

However, any other division of air quantities is also conceivable, and therefore the two ball valves 7, 9 are connected parallel, so that with the total of four bores 21, 22 present, fine differentiation of the air quantity introduced with respect to the bulk material can be accomplished.

A 60:40 air quantity distribution could for example also exist between the conveyor pipeline 1 and the shunt line 13 in the normal conveying situation.

According to the invention, it is now provided in accordance with a first mode of operation of the present invention, that the motor drive of the ball valve 12 is opened intermittently by a time 28 via the control line 27, so as to switch over from the smaller-caliber bore 21 to the larger-caliber bore 22. In that case, instead of the air quantity $V_{NL1}$, the larger air quantity $V_{NL2}$ is introduced into the shunt line 13, with the result that the spill valves 17a, 17b, 17c open in succession and blow an increased air quantity into the conveyor pipeline 1, even though a plug may not necessarily have already formed there. This means that a timed, intermittently-initiated loosening up of the bulk material in the conveyor pipeline 1 occurs, so as to preventively counteract the development of a stoppage.

The amount of the increased air quantity VNL2 determines how many valves are to be opened in succession, downstream of the spill valve 17a that always opens.

In this way, it is therefore possible to determine precisely how many spill valves 17a, 17b, 17c, and so forth open one after the other, so as to loosen up only a precisely defined length of the conveyor pipeline, beginning at the infeed point, and counteract development of a plug.

In a preferred second mode of operation of the present invention, it is provided that this raising of the air quantity in the shunt line 13 occurs whenever stopping up of the conveyor pipeline is ascertained via the contact manometer 3. The motor drive of the ball valve 12 is then switched over as well, so that an increased air quantity $V_{NL2}$ is blown into the shunt line 13, which again causes the successive opening of the spill valves 17a, 17b, 17c, etc., disposed one after the other.

The second mode of operation accordingly provides for loosening up and elimination of an already-formed plug, while the first mode of operation provides preventive venting of the conveyor pipeline in order to prevent plug development.

FIGS. 4 and 5 schematically show the air quantities; FIG. 4 shows the air quantity in the conveyor pipeline 1, and FIG. 5 the air quantity in the shunt line 13.

In order to keep the total air quantity—preferably—the same, it is provided that if a switchover is made in the shunt line 13 from the lower air quantity $V_{NL1}$ to the increased air quantity $V_{NL2}$, then at the same time the air quantity in the conveyor pipeline 1 is correspondingly lowered, so that the same air quantity (in the form of the sum of the air quantity of the conveyor pipeline and the air quantity in the bypass line) is always taken from the supply line 4.

FIG. 6 shows a hyperbola graphically showing all the spring forces of the valves as they are established from the over the length of the conveyor pipeline, starting at the beginning of the conveyor pipeline.

The vertically downward-pointing arrows at positions 17a, 17b, 17c show that given the corresponding spring force (for instance, as a function of the length of the arrow 17a), the valve opens when the pressure in the bypass line is higher than the spring force symbolically represented by the hyperbola.

In the diagram of FIG. 6, the spill valves 17a, 17b, 17c thus blow air while a further spill valve 17d is still closed, since in that curve region the hyperbola is located below the zero line.

When the air quantity $V_{NL1}$ is increased to the air quantity $V_{NL2}$ (FIG. 7), the hyperbola rises accordingly; that is, the intersection 31 of the hyperbola 32 with the abscissa shifts to the right, so that the spill valve 17d now blows air as well and feeds the increased air quantity $V_{NL2}$ into the conveyor pipeline 1.

The embodiment of the Laval ball valve is also claimed in the present invention. That is, any versions of the Laval ball valve that have been described above are considered to be patentable independently.

We claim:

1. A method for operating a conveyor pipeline with pneumatic dense phase conveying, in which bulk material is fed into the conveyor pipeline and conveyed in it by means of compressed air, and additional compressed air is blown into the conveyor pipeline by a pure-gas-carrying shunt line with feed lines branching off from it at regular intervals over the length of the conveyor pipeline, each feed line having an associated spill valve, wherein the closing forces of the spill valves are adjusted over the length of the conveyor pipeline in downstream order in accordance with a desired increasing course of closing force, and spill valves open if the pressure in the corresponding feed line is greater than the closing force of the corresponding spill valves, wherein during conveying of the bulk material in the conveyor pipeline, the pressure in the shunt line is varied repeatedly by varying the air quantity introduced into the shunt line, in order accordingly to open a predetermined number of the spill valves for blowing out into the conveyor pipeline.

2. The method of claim 1, wherein the air blown into the shunt line can be introduced selectively into at least two different-sized flow rates.

3. The method of claim 1, wherein the variation of the air flow rate introduced into the shunt line is timed.

4. The method of claim 1, wherein the air flow rate introduced into the shunt line is varied intermittently.

5. The method of claim 1, wherein when the pressure in the conveyor pipeline exceeds a certain limit value, a greater air quantity is introduced into the shunt line, and when the limit valu e is not realized, a lower air flow rate is utilized.

6. The method of claims 1, wherein the air quantity introduced into the shunt line is selectively diverted, in a bypass around the conveyor pipeline, from the total air quantity introduced from a supply line, and this air is thus split into a conveying air quantity and a bypass air quantity.

7. The method of claim 6, wherein when the bypass flow rate is increased, the flow rate of the conveying air is simul taneously reduced.

8. The method of claim 6, wherein there is a constant air quantity from the supply line and a 50:50 air distribution of the air quantity in the conveyor pipeline and the shunt line.

9. The method of claim 6, wherein there is a constant air quantity from the supply line and a 60:40 air distribution of the air quantity in the conveyor pipeline and the shunt line.

* * * * *